(12) United States Patent
Kruse et al.

(10) Patent No.: US 9,011,586 B2
(45) Date of Patent: Apr. 21, 2015

(54) MICROCOATING COMPRISING SILOXANES

(75) Inventors: Thomas Kruse, Dortmund (DE);
Bettina Werner, Hückeswagen (DE);
Gerhard Reusmann, Essen (DE)

(73) Assignee: Ewald Dörken AG, Herdecke (DE)

( * ) Notice: Subject to any disclaimer, the term of this patent is extended or adjusted under 35 U.S.C. 154(b) by 1944 days.

(21) Appl. No.: 10/593,700

(22) PCT Filed: Mar. 21, 2005

(86) PCT No.: PCT/EP2005/002984
§ 371 (c)(1),
(2), (4) Date: Dec. 4, 2007

(87) PCT Pub. No.: WO2005/090502
PCT Pub. Date: Sep. 29, 2005

(65) Prior Publication Data
US 2008/0234417 A1      Sep. 25, 2008

(30) Foreign Application Priority Data
Mar. 19, 2004    (DE) .................. 10 2004 014 032

(51) Int. Cl.
| C09D 5/10 | (2006.01) |
| C09D 4/00 | (2006.01) |
| C09D 5/08 | (2006.01) |
| C09D 7/12 | (2006.01) |
| C08K 3/34 | (2006.01) |

(52) U.S. Cl.
CPC ... C09D 4/00 (2013.01); C08K 3/34 (2013.01); C09D 5/086 (2013.01); C09D 5/10 (2013.01); C09D 7/1216 (2013.01)

(58) Field of Classification Search
USPC .............. 106/14.14, 14.21, 287.14, 287.13, 106/287.15, 287.16
See application file for complete search history.

(56) References Cited

U.S. PATENT DOCUMENTS

| 3,689,300 | A | * | 9/1972 | Bunger et al. ............ 106/287.1 |
| 3,986,997 | A | * | 10/1976 | Clark ............................ 524/300 |
| 4,209,555 | A | | 6/1980 | Stewart |
| 4,218,354 | A | | 8/1980 | Hayati et al. |
| 4,324,712 | A | | 4/1982 | Vaughn, Jr. |
| 4,383,062 | A | * | 5/1983 | Saad et al. ...................... 524/35 |
| 4,439,239 | A | * | 3/1984 | Greigger et al. ......... 106/287.16 |
| 4,532,096 | A | * | 7/1985 | Bogner et al. ................. 264/109 |
| 4,624,870 | A | * | 11/1986 | Anthony ........................ 427/387 |
| 4,680,232 | A | * | 7/1987 | Factor et al. ................... 428/412 |
| 4,855,348 | A | * | 8/1989 | Strader .......................... 524/317 |
| 4,863,520 | A | * | 9/1989 | Factor et al. ............. 106/287.12 |
| 5,137,573 | A | * | 8/1992 | Daimon et al. .......... 106/287.16 |
| 5,164,003 | A | * | 11/1992 | Bosco et al. .............. 106/287.1 |
| 5,316,854 | A | | 5/1994 | Lin et al. ....................... 428/426 |
| 5,477,918 | A | * | 12/1995 | Grulke et al. ................. 165/133 |
| 5,538,793 | A | * | 7/1996 | Inokuchi et al. .............. 428/407 |
| 5,755,867 | A | * | 5/1998 | Chikuni et al. .......... 106/287.16 |
| 5,789,082 | A | * | 8/1998 | Treadway ..................... 428/412 |
| 5,827,921 | A | | 10/1998 | Osawa et al. |
| 5,868,819 | A | | 2/1999 | Guhde et al. |
| 5,993,910 | A | * | 11/1999 | Carre et al. ................... 427/387 |
| 6,087,438 | A | * | 7/2000 | Herber et al. ................. 524/588 |
| 6,170,527 | B1 | | 1/2001 | Hayashi et al. |
| 6,287,371 | B1 | | 9/2001 | Ota et al. |
| 6,287,372 | B1 | | 9/2001 | Briand et al. |
| 6,355,189 | B1 | * | 3/2002 | Basil et al. .................... 252/588 |
| 6,482,274 | B2 | | 11/2002 | Shimakura et al. |
| 6,620,514 | B1 | * | 9/2003 | Arpac et al. .................. 428/447 |
| 6,719,836 | B2 | | 4/2004 | Nederlof et al. |
| 6,770,327 | B2 | | 8/2004 | Edelmann et al. |
| 6,841,197 | B2 | | 1/2005 | Standke et al. |
| 6,939,908 | B1 | * | 9/2005 | Singhal et al. ................ 524/430 |
| 7,192,986 | B2 | * | 3/2007 | Koyanagi et al. .............. 516/34 |
| 2002/0061407 | A1 | * | 5/2002 | Colton et al. ................. 428/447 |
| 2003/0157344 | A1 | * | 8/2003 | Shoup et al. .................. 428/447 |
| 2004/0022950 | A1 | | 2/2004 | Jung et al. |

FOREIGN PATENT DOCUMENTS

| CN | 1172135 A | 2/1998 |
| CN | 1332213 A | 1/2002 |
| EP | 1199339 A1 | 4/2002 |
| EP | 1233043 A | 8/2002 |
| ES | 2185793 A | 5/2003 |
| GB | 2036053 A | 6/1980 |
| JP | 5594971 A | 7/1980 |
| JP | 56125466 A | 10/1981 |
| JP | 10183064 A | 7/1998 |
| JP | 2002105401 A | 4/2002 |
| JP | 2002121485 A | 4/2002 |
| JP | 2002226490 A | 8/2002 |
| JP | 2003126775 A | 5/2003 |
| WO | 9409075 A | 4/1994 |

* cited by examiner

Primary Examiner — Margaret Moore
(74) Attorney, Agent, or Firm — Bachman & LaPointe, P.C.

(57) ABSTRACT

The invention relates to a binding agent comprising an aqueous, film-forming, polymeric siloxane. The invention also relates to a coating agent that is produced using said binding agent and to a workpiece that is coated with said coating agent.

26 Claims, No Drawings

MICROCOATING COMPRISING SILOXANES

BACKGROUND OF THE INVENTION

The invention relates to a binder and a coating composition, in particular for metal surfaces.

Binders are an essential ingredient of coating compositions. They effect the coherence of the various components of a coating composition and contribute to the coating formation. The manufacture of coating compositions necessitates the employment of additives in conjunction with binders. The expression "additives" is used in the context of this invention for all additives to a binder which affect the properties of a coating composition, independent of the amount in which the additives are added.

Coating compositions which include a binder and, as an additive, a particulate metal are known. These compositions are also referred to as base-coat and provide undercoats which may then be coated with lacquers, so-called top-coats. In the following, important literature is cited forming part of the state of the art for such base coats:

U.S. Pat. No. 6,287,372 (Themec Company Incorporated, 2000) Here a zinc coating is described for corrosion protection. A siloxane-polymer resin is described serving as a binder, more accurately: a pre-hydrolized inorganic alkyl-silicate-compound such as Silbond $XHT_{33}$. In the specification it is mentioned that alkyl-silicates are preferred, but that it is assumed that other siloxane polymer resins may be employed equally well. The compositions mentioned contain solvents, as a consequence of which, when processing, and in particular when drying the coating, volatile compounds are liberated.

U.S. Pat. No. 5,477,918 (United Technologies Corporation) A formulation for an aqueous anti-corrosion agent is described. The binder employed in the formulation is a silicone resin emulsion which is not water soluble. The binder must be compounded with an emulsifier in order to be able to produce an aqueous anti-corrosive agent. The anti-corrosive agent liberates up to 200 g/L of volatile substances, even in aqueous solutions. This is, therefore, not a purely aqueous formulation. The liberation of volatile substances is not prevented to an adequate degree.

U.S. Pat. No. 4,218,354 (Stauffer Chemical Company) A solvent containing anti-corrosive agent based on pre-hydrolized organic siloxane compounds, compounded with metal particles is proposed. This concerns an anti-corrosive agent which is usually produced with sub-stochiometrically amounts of water for the formation of a siloxane condensate, but which is soluble only in the acid pH-range and—according to a Claim 1—only in the presence of organic solvents. Although in this manner the liberation of volatile components during condensation of the monomers is prevented, the processing of the proposed anti-corrosive agent remains problematical because of the required organic solvent and does not comply with present day requirements any more.

WO 94/09075 (Wacker Chemie) An aqueous anti-corrosive agent is proposed in WO94/09075. Pre-hydrolized silanes which, however, once again, are not water soluble, are introduced into water with the aid of emulsifying agents. It is a drawback of these anti-corrosive agents that the coatings based thereon are not particularly temperature-resistant. At 120° C. and beyond, the coating softens and the emulsifying agents contained therein, frequently tensides, act as plasticizers which intercalate with water. As a result the field of employment of this anti-corrosive agent is substantially restricted.

DE 198 18 923 (Degussa-Hüls AG) Water-soluble amino- and alkenyl-functional organosiloxanes are described which, after hydrolysis, when curing, no longer liberate alcohols. These organosiloxanes are employed for the coating of pigments. The coated pigments are then dried and used in various fields. The organosiloxanes described in this document are no cross-linkage formers. They are hydrophilic and, although suitable for the coating of pigments, they are not suitable for applications in which a good film formation or corrosion protection is important.

It is an object of the invention to propose an aqueous binder which regarding the various applications thereof should be adjustable as much as possible in relation to the conditions of curing and a coating composition based on the use of this binder, in particular a corrosion protection composition which is substantially free of organic solvents and which cures without organic reaction products.

SUMMARY OF THE INVENTION

This object is attained by a binder including an aqueous, film forming, polymeric siloxane. The binder according to the invention is aqueous which allows an environmentally friendly processibility in simple installations. The binder, moreover, is a film former so that it is suitable for use for coatings. By means of the binder according to the invention, coatings of a variety of coating thicknesses can be produced in a simple manner. The binder can be employed as a single layer but also in multiple layered coating structures as will be explained further below. The polymeric siloxane ensures stable coatings, an easy processibility and the compatibility with additives which are added to a binder in the manufacture of coating compositions.

DETAILED DESCRIPTION

The polymeric siloxane employed according to the invention as a binder only includes a low content of alkoxy groups. It is preferably free of alkoxy groups, that is to say, the content of alkoxy groups is lower than 10% by weight, preferably less than 5% by weight, particularly preferably less than 2% by weight, in each case based on the polymeric siloxane.

Silanes including epoxy-, mercaptane- or hydroxy alkyl groups, are preferably employed for the manufacture of the polymeric siloxane, silanes containing mercaptane groups because of odour problems having a limited field of application. However, alkyl-, in particular alkenyl silanes may also be employed. Methacrylicsilanes are likewise suitable, in particular if the binder is to be cured with the aid of UV-light.

The binder according to the invention may be structured as a homo- or hetero-polymer. In contrast to the state of the art it is preferred not to employ monomers as binder. Rather, the binder is composed predominantly of already condensed molecules. The monomer content is less than 10% by weight based on the overall solids content of the binder, preferably less than 5% by weight, particularly preferably less than 3% by weight, advantageously below 1% by weight, in each case based on the overall solids content of the binder.

It is a substantial advantage of the afore going features that, during curing of the binder, hardly any alcohols are split off. The proportion of the split off alcohol amounts to less than 10% by weight based on the amount of binder, advantageously less than 5% by weight, particularly advantageously less than 2% by weight, in each case based on the amount of binder. Even though a binder is employed which has already been pre-hydrolized or pre-condensed, the reactivity of the polymeric siloxane is adequate, e.g., when using it as a binder, to stabilize and fix a base coat on the metallic substrate. The polymeric siloxane according to the invention is no longer present in its monomeric form, even though it has not been condensed to its gel point. In that condition it is excellently suitable for the coating of work pieces. Yet, the polymeric siloxane according to the invention is preferably water soluble without the addition of emulsifying agents.

It is also preferred that the binder contains no acid added for catalysis. Acids, e.g. hydrochloric acids, are normally necessary according to the state of the art as catalyst for the production of binders from monomers. The production of the binder without the addition of acid is in particular of advantageous effect if the binder is employed in corrosion protection compositions because acids which may still be present in the cured coating, act hydrophyllically which is decidedly disadvantageous for corrosion protection.

According to an advantageous embodiment of the invention the silanes include particles having dimensions below 100 μm. Preferred are particles having a diameter of up to 50 μm, advantageously of up to 20 μm, particularly advantageously of up to 10 μm, preferably the diameter of the particles is in the nanometer range, that is to say less than 1 μm. If the binder is employed either directly or as a component of coating compositions in very thin coating thicknesses, it may prove to be advantageous to employ particles having dimensions of less than 1 μm, preferably smaller than 55 nm, particularly preferred smaller than 10 nm, preferably smaller than 5 nm. Particles and monomeric silanes are mixed. The silanes hydrolize to polymeric siloxanes and envelop the particles so that a filled binder is formed in which the silanes, condensed to form polymeric siloxanes, envelop the particles.

Particles may be employed which consist of silicon or which contain silicon, in particular silicon dioxides are employed which can be provided and employed, for example, in the form of silicasoles, siloxanes or polysilicates. Colloidal silicon dioxide or particulates silicic acid, also known an silicic soles are particularly suitable. E.g. hydrogen-, lithium-, potassium or sodium polysilicates may be employed as polysilicates. In particular, modified silicic soles which are stable in the acid pH range are suitable for employment in the binder according to the invention. The modification of the surface is frequently attained by chelation of metals or metal salts to the silicic soles.

However, other organic or inorganic particles may also be used. Preferably used are e.g. metal salts, -oxides or -alkoxides, in particular if they are available in suitable particle sizes. The particle sizes suitable for the use according to the invention may also be obtained in that the aforesaid metal salts, -oxides or -alkoxydes are mixed with carrier substrates. Advantageously employed may be aluminum-, titanium-, molybdenum-, zirconium-, yttrium-, niobium-, cerium- or lanthanium-compounds or mixtures of such compounds, optionally mixed with carrier substrates. Conventional corrosion protection pigments may also be employed, optionally in mixture with the aforesaid particles, e.g. phosphates, phosphonates, phosphides, in particular iron phosphides and/or molybdates. Conductive pigments, in particular inorganic conductive pigments, e.g. silicon, preferably of wafer quality, nanotubes, carbon black, ICPs (intrinsic conductive polymers) may also be employed, optionally mixed with the aforesaid particles. The particles may, according to the invention, be employed in the following quantity ratios—based on whatever monomeric silane is employed on site for the particular manufacture of the binder—:the molar ratio silane: particles may be adjusted to from 50:1 up to 1:50, advantageously from 20:1 up to 1:2, preferably from 10:1 up to 1:10, particularly preferred from 5:1 up to 1:5. According to a particularly suitable embodiment it lies in the range silane: particle 2:1 to 1:2.

A deciding factor for a preferred application of the binder for the use of corrosion protective agents is that the particles must be of a kind which, when using the binder in a coating composition, will act as little as possible hydrophylically after curing. In this context, in particular the afore described polysilicates were found to be very suitable.

According to a preferred embodiment of the invention the admixture or envelopment of particles with dimensions of less than 100 μm in the silanes results in a particularly dense, filled, film-forming binder, which is stable in aqueous solution. Depending on the requirements of various fields of application, organic solvents may also be admixed to the aqueous solution of the binder. When removing the solvent or solvent mixture respectively, the binder as well as any substances, which may be contained therein, will adhere to the surface of the substrate to be coated. The curing of the binder to completion requires in particular the total removal of the solvent, as a rule the removal of the water. This is in spite of the fact that chemical reactions, in particular condensation reactions, also contribute with the binder according to the invention to the attainment of a complete curing, however, to a far lesser extent than, e.g. when employing known binders which predominantly or exclusively rely on the employment of monomers. In this respect, in particular, the particular inventive quality of the binder is manifested: whereas, according to the state of the art, during complete curing, large amounts of alcohols are liberated, the binder according to the invention essentially only liberates water from condensation reactions. In that manner the liberation of in part toxic but in particular also flammable substances during curing, is avoided. The content of water and, where applicable, other solvents may be between 10% by weight and 99.5% by weight, based on the overall formulation of the binder. Advantageously, the content of water and where applicable other solvents amounts to up to 90% by weight, particularly advantageously up to 75% by weight, preferably up to 50% by weight, particularly preferably up to 30% by weight.

The binder according to the invention preferably only starts curing at temperatures which are clearly above room temperature. Measured here are object temperatures, that is to say the temperature is determined and given which is measured on the object to be coated. On the one hand, with elevated curing temperatures, the risk is avoided that, when employing the binders according to the invention in open dipping vessels, the curing of the binders already commences prior to the application on to a work piece or that, in the case of heaped small articles such as screws or the like, due to a premature curing, small coated work pieces stick together, so that no satisfactory coating is formed. On the other hand, the successive steps of application and curing of the binder can be better coordinated and controlled. It is preferred that the binder according to the invention cures at object temperatures of above 40° C., preferably of above 80° C., particularly preferably of above 150° C., advantageously up to 300° C., particularly advantageously up to 500° C. The last mentioned curing temperatures above 150° C. are particularly of importance for applications in which an at least partial degradation of the organic components of the binder is tolerated. The aforesaid curing temperatures are applicable to an employment of the binder without any further additives but also to coating compositions manufactured with the aid of this binder.

The binder may cure to completion very rapidly in about 1 second or very slowly in about 90 minutes. It is to be considered an advantage of the binder that the complete curing within a wide time frame can be adjusted. The adjustment of the time for complete curing may be adapted to the curing requirements of the processor, for example, by the manner in which the energy required for complete curing is applied, in a conventional convection oven, my means of UV-light or by induction. Alternatively, the time for complete curing of the binder may be influenced by the selection of the silanes employed in the manufacture of the binder or even by the addition of additives, typically high-boiling substances (solvents). The time for complete curing preferably amounts to between 2 and 60 minutes, preferably between 3 and 30 minutes.

According to an advantageous embodiment of the binder, the aqueous polymeric siloxane has a molecular weight of at least 200 g/mol, advantageously at least 400 g/mol, particularly advantageously at least 800 g/mol, preferably of 1000 g/mol. A molecular weight in this order of magnitude ensures that, on the one hand, the hydrolysis and condensation is sufficiently advanced so as to exclude the volatilization of organic components or at least to inhibit this to a very far-going extent. On the other hand, with a molecular weight of at least 1000 g/mol an adequate reactivity and water solubility still is ensured which is decisive for the employment properties of the binder.

It is preferred, if the binder has a solids content of at least 0.5% by weight, preferably of at least 10% by weight, particularly preferably of at least 25% by weight, advantageously of at least 50% by weight, particularly advantageously of up to 70% by weight, according to a preferred embodiment of up to 90% by weight. With a solids content of at least 0.5% by weight the binder can be manufactured, transported, stored and employed as well as processed.

The binder according to the invention is adjusted for acid or neutral reaction, but may also reach alkaline pH-values. In that range it is stable in aqueous solution. The preferred pH-range ranges from pH 2 to pH 13, advantageously from pH 3 to pH 8. The pH-value depends initially on the silane employed as starting product or, where applicable, the mixtures of silanes employed for the manufacture of the polymeric siloxanes, and which optionally may be compounded with the afore described particles, in particular silicic soles. It may, however, also be determined as a function of the applicable application.

According to an advantageous further development of the inventive concept, the binder may contain, as a starting product for the manufacture of the binder, besides silanes, also organic co-binders. In this context may be mentioned, for example, alkyde resins, aqueous or water-diluted epoxy resin esters, acrylate dispersions, phenoxy resins, melamine resins, polyurethane resins or epoxy resins. Co-binders may be added for various reasons, in order to set up properties suitable for the specific field of application, e.g. for improved bonding, for improved incorporation of further substances which are added during the further processing into coating compositions, for the adjustment of processing conditions and curing conditions, as well as for controlling the film-forming properties of the polymerized film. The amount of the co-binder employed amounts to 0.01% by weight up to 50% by weight based on the respective solids content of the binder.

The binder according to the invention may be adapted based on the applicable purpose of use, and may therefore be made available with a solids content of 0.5 to 90% by weight, ready for supply. This binder may be employed alone without further additives for the coating of work pieces, for example for the sealing of surfaces. The employment as a top coat, i.e. as a transparent cover coat is readily possible. Another typical mode of employment of the binder is its use in coating compositions for surfaces, in particular for corrosion protection compositions and for colorless or color-imparting coating compositions. The binder or a coating composition manufactured using the afore described binder may be employed for the coating of a variety of work pieces. Large work pieces or surfaces, as well as small components, in particular mass produced small components such as screws, springs, clamps or clips can be coated. Typical fields of use are, for example, the coating of work pieces as well as shelf-goods, that is to say large work pieces which are coated individually, as well as of mass-produced small parts. Besides this coating by coil-coating processes in which the coating composition is usually applied by casting, doctor blade coating or in spray procedures, constitutes an important field of application.

The binder or the coating composition produced therewith, can be employed for the nowadays conventional single- or multiple layered surface coatings, e.g. for coating of untreated or pre-treated metals. Pre-treated metals may have been pre-treated mechanically, e.g. by shot-blasting, but chemically pre-treated metal surfaces, e.g. phosphortized metal surfaces may also be coated. The pre-treated metal surfaces may also be pre-treated with a bonding primer. Passivated metal surfaces, beneficiated with zinc or zinc alloys may likewise be coated. A coating on such a substrate is conventionally referred to as a top-coat or sealing.

It is considered a particular advantage that, when using a standardized binder a series of coating compositions can be offered, suitably to match: thus, for example, a first coating composition, a so-called base coat, may contain additives which contribute to corrosion protection. A second coating agent may then contain colouring pigments and a third coating composition contains no further additives but is applied in the manner of a top coat or as a surface sealing onto the first and the second coating composition. All of the aforesaid coating compositions contain the binder according to the invention. The third coating composition essentially consists of the binder according to the invention which is optionally adapted to the processing conditions.

Also frequently, a base coat is applied onto a metallic passivated substrate, beneficiated with zinc or a zinc alloy, either in a single layer or in a plurality of layers. A top coat is then applied to the base coat. The base coat and the top coat contain the same binder.

Coating compositions according to the invention may be employed using the same formulation in a plurality of layers or in different formulations, but using the same binder in a variety of manners. In this context it is an advantage that, due to the use of the same binder, the identical or at least similar processing conditions can be employed and the coats will adhere well, one on the other.

The solids content of the coating composition amounts to at least 0.5% and a maximum of 95%, preferably at least 1%, more preferably at least 20%, advantageously more than 50%.

The coating compositions, besides the binder, comprise one or more additives. These additives may be selected from a wide selection of substances—as will be explained in what follows. They may be solid or liquid or pasty additives. Single additives may be employed or even mixtures of additives. The mixtures may be employed both of additives for the setting up of various properties as well as for the setting up of identical properties of the coating composition.

In a simple embodiment, only additives are added to the coating composition besides the binder which insure the processing of the binder under practical conditions, and optionally are adapted to further coating compositions. These may be additives for the adjustment of the substrate wetting, the viscosity and/or for adjusting the curing temperature or—time. Examples of such additives are water, alcohols, ketones, glycols, polyglycols, polypropylene glycol, glycol ethers, glycol ether esters, in particular dipropyleneglycol, texanol, methoxypropanol, butyle glycol and aromatic or aliphatic hydrocarbons. Those additives are added to the coating composition in amounts of 0.01% by weight to 25% by weight, preferably 0.1% by weight to 15% by weight, each based on the overall formulation of the coating composition.

As additives, also solid or liquid waxes as emulsion or dispersion may be added to the coating composition according to the invention in order, for example, to adjust the gliding properties of the coating. Conventional and known waxes may be employed, e.g. waxes on the basis of polyethylene or polypropylene, polytetrafluorethylene, polyvinylidenefluoride, or even natural waxes such as carnauba wax or mixtures of the aforementioned substances. Waxes may be employed—individually or in combination—in amounts of 0.01 to 40% by weight based on the overall formulation of the coating composition in the form in which it is supplied.

Besides the binder according to the invention, the coating composition may furthermore contain additives which influence the rheology, the defoaming, the flow properties, the de-aeration or the pigment wetting, but also agents for flexibilization or catalysts as well as water-capturing agents. These additives may each be added in proportions of 0.01 to 20% by weight based on the overall formulation of the coating composition. Advantageously, between 2% by weight and 8% by weight, preferably less than 2% by weight, particularly preferably less than 1% by weight are added. In particular, monomeric or oligomeric silanes which act as water-capturing agents are frequently employed additives.

According to an advantageous embodiment the coating composition includes, besides the binder, as further additive pigments or pigment paste which provide a coloring. These may be conventional organic or inorganic pigments or pigment pastes or even dyes, i.e. soluble solids having dye properties. Particular for the coating of metals, it is also possible to employ metal particles such as, for example, aluminum particles as pigments in order, e.g. to attain metallic effects. Besides the pigments, pigment pastes or dyes, fillers may be employed as additives, for example, calcium carbonate or silicates, in particular aluminum or magnesium silicates, barium sulphate or mixtures of fillers. The coloring pigments, pigment pastes, dyes and/or fillers are generally added in a proportion of 0.01% by weight to 60% by weight based on the overall formulation of the coating composition.

Particularly preferred is the employment of the binder in a coating composition employed as a corrosion protection composition. The coating composition then includes the binder according to the invention as well as solid and/or liquid additives which improve the corrosion resistance of the pretreated metal. Within the scope of the invention, in water soluble, dispersible or mixable corrosion inhibitors and/or corrosion preventing or retarding pigments are added with good effect, preferably nitrogen-containing compounds, in particular organic nitro compounds. Particularly preferred is dinitrosalicylic acid. A further preferred addition to the coating composition are boron compounds, in particular from the group of boric acids or boric oxides, but also molybdenum compounds, in particular molybdates or compounds which contain phosphorus. These corrosion inhibitors are added in amounts of 0.01% by weight up to 30% by weight based on the overall formulation, the lower limit being determined by the attainment of a desired effect, whereas the upper limit is determined on cost considerations.

Highly effective corrosion protection is attained if to a coating composition containing the binder according to the invention, further additives are added which provide a cathodic corrosion protection. A plurality of metals, metal compounds and/or metal alloys are suitable for beneficiating or coating metal surfaces in order to prevent corrosion. They are employed as particulate metals. Within the scope of the invention, in particular, zinc, aluminum, iron, manganese and tin are used as particulate metals, zinc-aluminum-particles, zinc-manganese-particles, zinc-nickel-particles or chromium-nickel-steel-particles as particulate metal alloys in conjunction with the binder according to the invention as corrosion protection agent for the coating of metal surfaces, where, in particular, zinc and zinc compounds as well as a zinc aluminum compound provide a highly effective cathodic corrosion protection. In particular, in the form of so-called flakes, these particulate metals offer an effective corrosion protection. Flakes are not spherical but platelet-shaped particles which enhance a good coating formation. The aforesaid metals and metal compounds are particularly suitable in order to protect metal surfaces against corrosion. The metals, metal compounds and metal alloys can be employed in pure form as well as in mixtures of two or more substances in the composition for coating. According to the invention for coating. According to a preferred embodiment of the invention conductive additives are added to the composition for coating, preferably organic or inorganic conductive substances including silicon, iron phosphide, carbon black, nano-tubes or ICPs.

According to a further advantageous embodiment of the invention, the particulate metal is employed in the form of dust, beads, spherical particles, lamellae and/or flakes. The layering of the metal particles resulting when applying these particles brings about a particularly good screening of the metal surface against corrosive effects. By mixing the metal particles, the corrosion protection composition may be adapted particularly well to the particular mode of application.

In order to further optimize the cathodic corrosion protection, a content of the particulate metal of about 10% by weight up to about 95% by weight, preferably of about 20% by weight up to about 80% by weight, particularly preferred of about 20% by weight up to about 60% by weight based on the overall formulation of the coating composition, was found to be suitable. When employing zinc dust for a coating composition, 10% by weight up to 95% by weight were found to be advantageous, particularly advantageously 60% by weight up to 80% by weight of zinc in the form or zinc dust based on the overall formulation of the coating composition. If particulate metal in the form of flakes is employed, e.g. as zinc-, zinc aluminum or aluminum flakes, the proportion of particulate metal to the overall formulation of the coating composition advantageously amounts to 20% by weight up to 50% by weight.

The coating composition according to the invention for the coating of metal surfaces may be designed, both as a single component-system, or as a two-component-system or multiple-component system. In particular, in the case of use as a corrosion protection agent, it may prove to be advantageous to initially store separately a component I and a component II and only to combine these when making the application. Should a mixture of different components required according to the formulation of the coating composition not be stable in storage, it is normal practice to manufacture, store and supply these components separately, and to mix them only for use.

For example, a corrosion protection agent may comprise a component I with at least one particulate metal as well as, optionally, a water-Substitute capturing agent. The corresponding component II comprises an aqueous, polymeric siloxane free of emulsifying agent, according to claim 1 as a binding agent. If necessary, an inorganic or organic inhibitor is added to the component II. The components I and II, according to a preferred embodiment, are stored separately from one another until the use of the composition, e.g. in a dipping bath. This extends the shelf life of the composition until use, e.g. in a dipping bath. According to a preferred embodiment the particulate metal is mixed with organic solvent, in particular when the particulate metal, because of its large surface area, tends to undergo decomposition reactions which are suppressed by the organic solvent.

The polymeric siloxane is generally employed in aqueous solutions. However, purely aqueous solutions cannot be employed in all cases, even though these are preferred. Depending on the compositions of components I and II, mixtures with organic solvents may be necessary. Preferred organic solvents which alone or in mixture with one another are employed with water, are alcohols, aromatic and/or aliphatic hydrocarbons, ketones, glycols, poly glycol, polypropylene glycol, glycol esters, glycol ethers and glycol ether esters, in particular dipropylene glycol, Texanol, methoxypropanol and butyl glycol, in each case as the sole solvent or as a mixture of the aforesaid solvents. The aforesaid solutions are added in an amount of 0.01% by weight up to 35% by weight, each based on the overall formulation of the coating composition.

Details of the invention will be further elucidated in the following working examples:

Binder

Binder 1

In the following, the synthesis of a binder for a molar-ratio silane:particles 1:2 is elucidated.

50 g Dynasilane® GLYMO of Degussa (0.21 mol) are mixed with 127.3 g silicate particles, in this case: Levasil® E of HC Starck (0.42 mol) and stirred for 1 hour at room temperature. After 1 hour methanol and water are spun-off under vacuum until a solids content of 50% is attained. The pH-value of the $SiO_2$-filled polymeric binder amounts to about 3.0.

Binder 2

Binder 2 is produced from Dynasilane® GLYEO of Degussa and Levasil®200 E of HC Starck in a molar ratio of 1:6 (silane: $SiO_2$): 50 g (0.18 mol) Dynasilane® GLYEO of the firm Degussa are mixed with stirring with 324.1 g (1.08 mol) Levasil® 200 E of the firm HC Starck and further stirred for 24 h at room temperature. After 24 h, ethanol and water are spun-off under vacuum until such time that a solids content of 50% has been attained.

The pH-value of the particle-filled polymeric siloxane amounts to about 3.

Binder 3

Binder 3 is produced from Dynasilane® GLYEO and Ludox® SK of the firm Grace Davidson in a molar ratio 1:6 (silane:$SiO_2$): 50 g (0.18 mol) Dynasilane® GLYEO are mixed with stirring with 259.3 g (1.08 mol) Ludox® SK, and stirring is continued for 24 h at room temperature. After 24 h, ethanol and water are spun-off under vacuum until a solids content of 50% is attained. The pH-value amounts to about 4.5.

Binder 4

Binder 4 is produced from Dynasilane® GLYEO and Snowtex® ST-O-40 of the firm Nissan Chemicals in a molar ratio of 1:10 (silane: $SiO_2$): 50 g (0.18 mol) Dynasilane® GLYEO are mixed with stirring with 270.1 g (1.8 mol) Snowtex® ST-O-40, and stirring is continued at room temperature for 24 h. After 24 h ethanol and water are spun-off under vacuum until a solids content of 50% is attained. The pH-value amounts to about 5.

Binder 5

Binder 5 is produced from Dynasilane® GLYEO and Snowtex® ST-O-40 in a molar ratio 1:6 (silane: $SiO_2$) at elevated temperature: 50 g (0.18 mol) Dynasilane GLYEO are mixed with stirring with 162.1 g Snowtex ST-O-40 and further agitated for 2 hours at 60° C. After 24 h ethanol and water are spun-off at 60° C. and reduced pressure until a solids content of 50% is attained. The pH-value amounts to about 5.

The aforesaid binders are all aqueous, film-forming, polymeric siloxanes. They can be applied as a coating onto work pieces, in particular those having metallic surfaces. When curing these binders to completion, only water from the condensation reactions is liberated. Alcohols or other volatile substances are not liberated by the curing of these polymeric siloxanes.

Coating Compositions

The use of the binders according to the invention in coating compositions is elucidated in the following. The coating composition according to this working example is composed of two components I and II. The components are produced and stored separately until their use. The separate storage ensures a longer shelf-life of the coating composition ready for use.

30 g DPG (dipropylene glycol) are mixed under the dissolver with 3 g of a wetting agent including an HLB-V (hydro-lipophile-balance-value) of about 12, in this case: Neodol®91-5 of the firm Caldig Deutschland GmbH and 2.6 g of a water capturing agent in the form of a monomeric silane, in this case: Dynasilane® GLYMO. After homogenizing, 88.3 g of a particulate metal are added. The particulate metal is here employed as a paste: zink-aluminium-powder having a content of 90±3% zinc and 7±3% aluminium based on 100% of the employed particulate metal and an average particle size of about 14 μm is processed with aliphatic hydrocarbons and lubricants to form a paste adjusted to a solids content of 90±2%. This paste is mixed under moderate shearing and dispersed for 60 min. until a highly viscous paste has been formed (component I).

For the manufacture of component II, 30 g of a 1% dinitrosalicylic acid solution (DNSS-solution) with 4.5 g of a thickening agent are mixed under shearing conditions for the adjustment of the viscosity, in this case: Aerosil® 200 of the firm Degussa, in that the Aerosil® 200 is slowly sprinkled into the DNSS-solution. The mixture is dispersed for 60 min. Thereafter, the thickened DNSS/A200-solution is added with stirring by means of a dissolver to 66 g of the $SiO_2$-filled polymeric binding agent, which has been produced as described above as Binder 1, and the mixture is homogenized for 60 min.

For the production of a dipping bath, the component II is slowly added under moderate shearing conditions to component I. The mixture of components I and II is thereafter homogenized in a dissolver at about 1-2 m/s shear velocity for 60 min. After 60 min the homogenized composition is further agitated over night (16 h) and is ready for processing on the next morning.

The coating composition has a viscosity of 30-40 seconds (Ford 4 discharge beaker) and a pH-value of about 5.2. For coating purposes, the coating composition is diluted with de-ionized water to a viscosity of 25 sec (Ford 4 discharge beaker). The adjusted material can be applied by the conventional coating method on to a variety of substrates.

Conventionally, the coating composition is applied by the dipping-spinning-process onto mass-produced small components such as, e.g. screws or nuts. However,—depending on the work piece to be coated—it may also be applied by casting, doctor-blade coating, spraying, roller-coating or dipping onto work pieces, e.g. onto shelf goods, i.e. individually to be coated major components or onto coils and subsequently pre-dried for 10 min at 80° C. Thereafter, the coating is cured to such an extent that the coated work piece can be transported. Either subsequent to the first coating or after applying further layers of coating compositions, the pre-dried material is polymerized for 30 min at 300° C., i.e. finally cured, so that the coating attains its final use characteristics.

This coating procedure is, for example, performed when coating screws in the dipping-spinning-process, conventionally twice. After the application of the first coat, the first coat is cured and further cooled. After the application of the second coat of the coating composition, the coating is pre-dried as described above and baked.

The coated screws (screw blank M10×80 according to DIN 931), after coating, exhibit e.g. a coating weight according to DIN 931 of 0.08 to 0.120 g/screw, preferably of 0.09 to 0.11 g/screw and, in the salt spray test according to DIN 50021, have a corrosion resistance against red rust >480 h, preferably >600 h. The finished coating composition exhibits, with agitation at 22° C./55° C. relative air humidity, a pot life of at least 7 days, maximally of 14 days. During such storage, it is necessary to continuously agitate and to cool as well as to control the viscosity and the pH-value. Prior to coating, the viscosity must be adjusted by the addition of de-ionized water to 25 sec (Ford 4).

Coating Composition Top-Coat

For the manufacture of a transparent top-coat which is applied as the only coat or the last coat of a multiple coating onto the surface of a work piece, a transparent coating composition is produced, using 5% by weight of the above described binding agent "Binder 1" and 95% by weight water, each based on the overall formulation of the coating composition. The coating composition can be applied by optional application procedures: it may, for example, be sprayed on, rolled on, doctor-bladed on, or be applied by dipping. The final curing of this cop coat proceeds over a period of 20 minutes at 150° C.

The invention claimed is:

1. Anti-corrosive coating composition including an aqueous, film forming, polymeric siloxane produced from at least one of the group consisting of alkyl- or alkenyl silanes, methacrylic silanes and silanes which contain epoxy-, mercaptane- or hydroxyethyl groups, then coating composition having a pH-value between 3 and 5,
    the coating composition further comprising particles enveloped by the siloxane, said particles being selected from the group consisting of aluminium, yttrium, niobium, cerium or lanthanium compounds and mixtures thereof, and nano-tubes, carbon black or intrinsic conductive polymers,
    said coating composition for coating of metal surfaces including at least one further additive,
    said additive being at least one particulate metal for the improvement of the corrosion properties of the metal surface to be coated, said additive being added in an amount of from 10 weight % up to 95 weight % based on the overall formulation of the coating composition,
    wherein during curing the coating composition liberates less than 5% by weight alcohols based on the overall amount of the coating composition.

2. Coating composition according to claim 1, wherein monomeric silane is employed in the manufacture of the coating composition and wherein the monomeric silane and the particles are employed in a molar ratio of between 50:1 and 1:50.

3. Coating composition according to claim 1, wherein the polymeric siloxane has a content of alkoxy groups of less than 10% by weight based on the polymeric siloxane.

4. Coating composition according to claim 1, wherein the content of monomers in the coating composition is less than 10% by weight based on the overall solids-content of the coating composition.

5. Coating composition according to claim 1, wherein the particles have dimensions of smaller than 100 μm.

6. Coating composition according to claim 1, wherein the particles have dimensions below 1 μm.

7. Coating composition according to claim 1, wherein then coating composition exhibits a time for final curing which is between 1 second and 90 minutes.

8. Coating composition according to claim 1, wherein the polymeric siloxane has a molecular weight of at least 200 g/mol.

9. Coating composition according to claim 1, wherein the solids content amounts to between 0.5% and 90.

10. Coating composition according to claim 1, wherein co-binders in an amount of 0.01% by weight up to 50% by weight based on the overall formulation of the coating composition have been added.

11. Coating composition according to claim 1, wherein the coating composition further comprises at least one additive for adjusting the curing period, the substrate wetting and/or for adjusting the curing temperature and/or for adjusting the viscosity of the metal surface to be coated in an amount each of 0.01 weight % to 25 weight % based on the overall formulation of the coating composition.

12. Coating composition according to claim 1, wherein, as additive, water, is employed in an amount of 0.01% by weight up to 25% by weight based on the overall formulation of the coating composition.

13. Coating composition according to claim 1, wherein, as additive, waxes and/or lubricating agents have been added in an amount of 0.01% to 40% based on the overall formulation of the coating composition.

14. Coating composition according to claim 13, wherein the waxes comprise solid or liquid emulsions or dispersions.

15. Coating composition according claim 1, wherein as additive catalysts or at least one additive for improving the rheology, the substrate wetting, the defoaming, the flow properties, the de-aeration, the pigment wetting, the flexibilization or as water capturing agent, have been added singly or in mixture in an amount each of 0.01% by weight up to 20% by weight based on the overall formulation of the coating composition.

16. Coating composition according to claim 1, wherein, as additive, pigments, pigment paste, dyes and/or fillers are employed in an amount of 0.01% by weight based on the overall formulation of the coating composition.

17. Coating composition according to claim 16, wherein metal particles are employed as pigments.

18. Coating composition according claim 1, wherein the coating composition has added thereto as additive a corrosion inhibitor and/or a corrosion preventing or retarding pigment or a mixture of such additives in solid or liquid form in an amount of 0.01% by weight up to 30% by weight based on the overall formulation of the coating agent.

19. A coating composition according to claim 1, wherein the at least one further additive comprises an additive selected from the group consisting of boron, molybdenum, phosphorous compounds, and combinations thereof.

20. Coating composition according to claim 1, wherein the particulate metal is selected from the group consisting of zinc, aluminium, iron, manganese, tin, and mixtures and alloys thereof and chromium-nickel-steel particles.

21. Coating composition according to claim 1, wherein the particulate metal is in the form of beads, spherical particles, lamellae or flakes.

22. Coating composition according to claim 1, wherein a solvent for the particulate metal is added to the coating composition in an amount of 0.01 up to 35 weight %, based on the overall formulation of the coating composition.

23. Coating composition for the coating of metal surfaces according to claim 1 comprising a first component, including
at least one particulate metal;
an organic solvent for the particulate metal; and a second component, including
the aqueous, film forming, polymeric siloxane and—a corrosion inhibitor for the particular metal.

24. Coating composition according to claim 23, wherein the first component and/or the second component has added thereto further additives.

25. Coating composition according to claim 23, wherein the first and second components of the coating composition are stored separately until used.

26. Work piece including a coating formed from a fully cured coating agent according to claim 1.

* * * * *